(12) United States Patent
Ikeda et al.

(10) Patent No.: US 8,978,365 B2
(45) Date of Patent: Mar. 17, 2015

(54) EXHAUST GAS PURIFICATION SYSTEM

(75) Inventors: Takashi Ikeda, Fujisawa (JP); Tetsuya Murata, Fujisawa (JP); Kenzou Yaginuma, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 162 days.

(21) Appl. No.: 13/699,492

(22) PCT Filed: May 16, 2011

(86) PCT No.: PCT/JP2011/061218
§ 371 (c)(1),
(2), (4) Date: Nov. 21, 2012

(87) PCT Pub. No.: WO2011/148815
PCT Pub. Date: Dec. 1, 2011

(65) Prior Publication Data
US 2013/0067896 A1    Mar. 21, 2013

(30) Foreign Application Priority Data

May 25, 2010    (JP) ................. 2010-119720

(51) Int. Cl.
*F01N 3/00*    (2006.01)
*F01N 3/02*    (2006.01)
(Continued)

(52) U.S. Cl.
CPC ............ *F01N 3/0821* (2013.01); *B01D 46/006* (2013.01); *F02D 41/0245* (2013.01);
(Continued)

(58) Field of Classification Search
USPC .................... 60/276, 285, 295, 297, 311, 324
See application file for complete search history.

(56) References Cited

U.S. PATENT DOCUMENTS 6,802,180 B2 * 10/2004 Gabe et al. ...................... 60/285
6,966,179 B2 * 11/2005 Onodera et al. ................ 60/295
(Continued)

FOREIGN PATENT DOCUMENTS

JP    2000-303826    10/2000
JP    2005-282479    10/2005
(Continued)

OTHER PUBLICATIONS

Written Opinion of the International Searching Authority mailed Jun. 21, 2011 in corresponding International Application No. PCT/JP2011/061218.
(Continued)

*Primary Examiner* — Thomas Denion
*Assistant Examiner* — Diem Tran
(74) *Attorney, Agent, or Firm* — Staas & Halsey LLP

(57) ABSTRACT

In the exhaust gas purification system, a diesel particulate defuser ("DPD") for trapping particulate matter ("PM") in exhaust gas is connected to an exhaust pipe of an engine to automatically regenerate the DPD by raising a temperature of the exhaust gas from the engine by carrying out post injection when an amount of PM in the DPD exceeds a predetermined amount. Further, the system includes detecting the temperature of the exhaust gas during DPD regeneration when the DPD is automatically regenerated, calculating a deviation between the detected temperature of the exhaust gas and a target temperature for the DPD regeneration, and controlling a quantity of the post injection by resetting an integral control term used in a PID control to zero when running mode automatic regeneration is shifted to idling mode automatic regeneration after a vehicle is stopped, when PID-controlling the quantity of the post injection based on the deviation.

11 Claims, 2 Drawing Sheets

(51) Int. Cl.
*F01N 1/00* (2006.01)
*F01N 3/08* (2006.01)
*B01D 46/00* (2006.01)
*F02D 41/02* (2006.01)
*F02D 41/08* (2006.01)
*F02D 41/14* (2006.01)
*F02D 41/40* (2006.01)
*F02D 41/24* (2006.01)
*F02M 25/07* (2006.01)
*F01N 3/10* (2006.01)
*F01N 3/023* (2006.01)
*F01N 3/035* (2006.01)

(52) U.S. Cl.
CPC ............. *F02D41/029* (2013.01); *F02D 41/08* (2013.01); *F02D 41/1446* (2013.01); *F02D 41/1482* (2013.01); *F02D 41/405* (2013.01); *B01D 2279/30* (2013.01); *F02D 41/1489* (2013.01); *F02D 41/2493* (2013.01); *F02D 2041/1409* (2013.01); *F02M 25/07* (2013.01); *F02M 25/0707* (2013.01); *Y02T 10/44* (2013.01); *Y02T 10/26* (2013.01); *F01N 3/106* (2013.01); *F01N 3/0235* (2013.01); *F01N 3/035* (2013.01)
USPC ................... 60/295; 60/285; 60/297; 60/311; 60/324

(56) References Cited

U.S. PATENT DOCUMENTS

| | | | | |
|---|---|---|---|---|
| 6,969,413 | B2* | 11/2005 | Yahata et al. | 55/282.3 |
| 6,978,602 | B2* | 12/2005 | Ohtake et al. | 60/295 |
| 7,024,850 | B2* | 4/2006 | Nishizawa et al. | 60/277 |
| 7,043,903 | B2* | 5/2006 | Onodera et al. | 60/295 |
| 7,337,608 | B2* | 3/2008 | Gabe et al. | 60/286 |
| 7,421,837 | B2* | 9/2008 | Abe | 60/295 |
| 7,845,165 | B2* | 12/2010 | Satou et al. | 60/295 |
| 8,161,736 | B2* | 4/2012 | Tsukada et al. | 60/295 |
| 2005/0217252 | A1 | 10/2005 | Sato et al. | |
| 2009/0007547 | A1 | 1/2009 | Onodera et al. | |

FOREIGN PATENT DOCUMENTS

| | | |
|---|---|---|
| JP | 4175281 | 10/2005 |
| JP | 2007-205223 | 8/2007 |
| JP | 2010-112251 | 5/2010 |

OTHER PUBLICATIONS

Patent Abstracts of Japan, Publication No. 2000-303826, Published Oct. 31, 2000.
Patent Abstracts of Japan, Publication No. 2005-282479, Published Oct. 13, 2005.
Patent Abstracts of Japan, Publication No. 2007-205223, Published Aug. 16, 2007.
Patent Abstracts of Japan, Publication No. 2010-112251, Published May 20, 2010.
International Search Report of PCT/JP2011/061218 mailed Jun. 21, 2011.

* cited by examiner

EXHAUST GAS PURIFICATION SYSTEM

CROSS REFERENCE TO RELATED APPLICATIONS

This application claims the foreign priority benefit of Japanese Application No. 2010-119720 filed May 25, 2010, the contents of which are incorporated herein by reference, which serves as priority for PCT Application No. JP2011/061218 filed May 16, 2011.

TECHNICAL FIELD

The present invention relates to an exhaust gas purification system that traps particulate matter (PM) in exhaust gas from a diesel engine, and purifies and discharges NOx, and more particularly to an exhaust gas purification system for when a vehicle makes a temporarily stop during automatic regeneration of a diesel particulate defuser (DPD) and idling mode automatic regeneration is then performed.

BACKGROUND ART

An exhaust gas purification system in which a diesel particulate defuser (DPD) and a selective catalytic reduction (SCR) apparatus are connected to an exhaust pipe has been developed as an exhaust gas purification system for purifying and discharging exhaust gas from a diesel engine.

In this exhaust gas purification system, the DPD traps PM contained in exhaust gas. Further, in the exhaust gas purification system, a SCR system provided with the SCR apparatus supplies a urea solution which is stored in a urea tank to an upstream side of exhaust gas in the SCR to thereby produce ammonia by heat of the exhaust gas. Then, NOx is reduced by the thus produced ammonia over a SCR catalyst and thereby purified (see Patent Documents 1 and 2, for example).

Since the PM trapped by the DPD causes filter clogging, it is necessary to appropriately oxidize and remove the PM which has been trapped and accumulated in the DPD to thereby regenerate the DPD.

The filter clogging is detected by detecting a differential pressure between front and back of the DPD by an exhaust pressure sensor. When the detected differential pressure reaches an upper limit, DPD regeneration is automatically started by an engine control unit (ECU), or manually started in such a manner that a driver pushes a switch for performing the regeneration when a DPD warning lamp which is provided inside a cabin is lightened.

The DPD includes a diesel oxidation catalyst (DOC) which comprises an active catalyst for oxidizing unburned fuel and a catalyzed soot filter (CSF) for trapping PM contained in exhaust gas. When the DPD regeneration is performed, multiple injection (pilot injection, pre injection, main injection, and after injection) of fuel is carried out to thereby raise an exhaust gas temperature to or above a catalyst activation temperature of the DOC. After that, post injection is additionally carried out to thereby raise the exhaust gas temperature to approximately 500° C. to 600° C. The PM trapped in the CSF is then burned by this high-temperature exhaust gas, so that the PM is removed to thereby regenerate the DPD.

The DPD regeneration is automatically performed while a vehicle is running, or manually performed while a vehicle is idling after stopping. Usually, the DPD is automatically regenerated while the vehicle is running. However, since fuel oil is mixed into lubricating oil in a cylinder due to the post injection and dilution of the lubricating oil therefore occurs, the amount of the dilution is adapted to be reduced by the manual regeneration.

Further, when the vehicle is stopped during the automatic regeneration during running (hereinafter, referred to as running mode automatic regeneration), an exhaust brake valve is closed to prevent the exhaust gas temperature from decreasing so that the regeneration can also be performed during idling, thereby continuing the regeneration.

In this automatic regeneration, the temperature of exhaust gas flowing into the CSF is detected by an exhaust gas temperature sensor which is provided at a downstream side of the DOC, a deviation between the detected exhaust gas temperature and a target temperature for regeneration (hereinafter, referred to as a target regeneration temperature) (500° C. and 600° C., for example) is calculated, and a quantity of the post injection is PID-controlled based on the calculated deviation so that the exhaust gas temperature becomes the target regeneration temperature.

PRIOR ART DOCUMENTS

Patent Document 1: Japanese Patent Application Publication No. 2000-303826
Patent Document 2: Japanese Patent No. 4175281

In the meantime, in the idling mode automatic regeneration when a vehicle is in a stopped state, an engine speed is reduced to an idle speed for regeneration and the exhaust brake valve is closed. This makes it possible to perform the automatic regeneration by carrying out the post injection while keeping the temperature of the exhaust gas in the DPD even during idling in which the engine speed is low and the amount of the exhaust gas is small.

However, even when the post injection is carried out with the exhaust brake valve closed as described above, since the amount of exhaust gas flowing in the DOC is small, a temperature during regeneration does not reach the target regeneration temperature in many cases. In addition, post-injected unburned fuel remains accumulated in the DOC.

Generally, proportional-integral-derivative ("PID") control is a control in which a proportional control term (P term), an integral control term (I term) and a derivative control term (D term) are combined to thereby achieve convergence to a set point. A manipulated variable is changed in the proportional control term (P term) so as to be proportional to a deviation. In the integral control term, deviations are summed up and the manipulated variable is changed so as to be proportional to the thus obtained value to thereby eliminate an offset (steady-state deviation) in the proportional control. Further, in the derivative control, the rate of change of the deviation is converted to velocity and the manipulated variable that is proportional to this velocity is obtained so as to increase a response speed and thereby achieve prompt convergence to the set point.

As described above, the temperature during regeneration does not reach the target temperature when the idling mode automatic regeneration is performed. Therefore, when the quantity of the post injection is controlled by the PID control, a constant manipulated variable is output based on deviation between the temperature during regeneration and the target temperature in the proportional control term, and further, a constant manipulated variable is output also in the derivative control term, as there is no deviation. Therefore, these control terms do not pose a problem for idling control even when the deviation does not change. However, in the integral control term, since deviations are summed up at a predetermined integration time, when the idling control takes longer, the manipulated variable in the integral control term is increased and raised to an upper limit value. Further, since the amount of exhaust gas during running is widely different from the amount of exhaust gas during idling, an optimal integral control term is necessary for each of the running time and the idling time.

When the value of the integral control term rises to the upper limit value in this manner and the idling mode automatic regeneration is shifted to the running mode automatic regeneration, if the exhaust brake valve is opened and the post injection is carried out with the manipulated variable that is determined in the previous PID control, there is a problem in that a large amount of exhaust gas flows into the DPD from the engine, unburned fuel accumulated in the DOC is also burned, and excessive overshoot of the temperature during regeneration with respect to the target temperature therefore occurs. In this case, only when the idling mode automatic regeneration takes long, the excessive overshoot occurs. On the other hand, it is believed that a brief idling stop is less influenced by the integral control term.

It is therefore an object of the present invention to solve the above problems and provide an exhaust gas purification system which is capable of accurately controlling the idling mode automatic regeneration when a vehicle is stopped during the running mode automatic regeneration, and also preventing the temperature of exhaust gas from overshooting even when the idling mode automatic regeneration is shifted to the running mode automatic regeneration.

SUMMARY OF THE INVENTION

To achieve the objects described above, there is provided an exhaust gas purification system in which a DPD for trapping PM in exhaust gas is connected to an exhaust pipe of a diesel engine to automatically regenerate the DPD by raising a temperature of the exhaust gas from a diesel engine by carrying out post injection when an amount of PM in the DPD exceeds a predetermined amount. The system includes detecting the temperature of the exhaust gas during DPD regeneration when the DPD is automatically regenerated, calculating a deviation between the detected temperature of the exhaust gas and a target temperature for the DPD regeneration, and controlling a quantity of the post injection by resetting an integral control term used in a PID control to zero when running mode automatic regeneration is shifted to idling mode automatic regeneration after a vehicle is stopped, when PID-controlling the quantity of the post injection based on the deviation.

There is also provided an exhaust gas purification system wherein when the idling mode automatic regeneration is shifted to running mode automatic regeneration within a predetermined time after the idling mode automatic regeneration is started after the vehicle is stopped, the quantity of the post injection is continuously controlled by the PID control in which the integral control term is reset to zero in the idling mode automatic regeneration.

There is also provided an exhaust gas purification system wherein when the idling mode automatic regeneration is shifted to running mode automatic regeneration over a lapse of a predetermined time after the idling mode automatic regeneration is started after the vehicle is stopped, the integral control term in the PID control is again reset to zero.

There is also provided an exhaust gas purification system wherein the predetermined time is 3 minutes.

There is also provided an exhaust gas purification system wherein when the vehicle is slowed down and then stopped during the running mode automatic regeneration, the post injection controlled by the PID control is continuously carried out while the vehicle is being slowed down, and the integral control term in the PID control is reset to zero after the vehicle is stopped.

There is also provided an exhaust gas purification system wherein an exhaust brake valve is closed when idling mode automatic regeneration is started, and the exhaust brake valve is opened when the idling mode automatic regeneration is shifted to running mode automatic regeneration.

The present invention has beneficial effects of being capable of eliminating the negative effects of the PID control during the idling mode automatic regeneration and preventing exhaust gas from overshooting in the DPD.

DETAILED DESCRIPTION

Hereinafter, preferred embodiments of the present invention will be described in detail based on the appended drawings.

Figure 1:
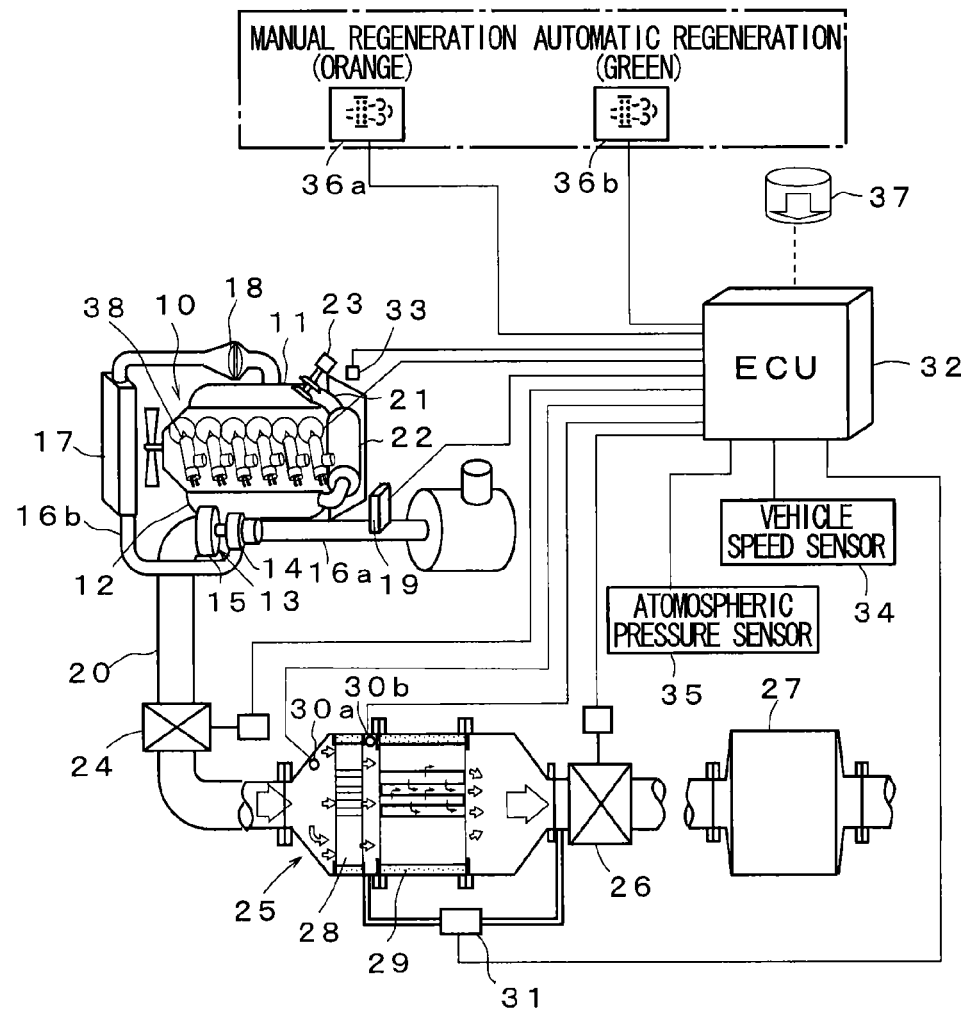
FIG. 1 is a diagram illustrating the overall structure of an exhaust gas purification system according to an embodiment of the present invention.

In FIG. 1, an intake manifold 11 and an exhaust manifold 12 of a diesel engine 10 are connected to a compressor 14 of a supercharger 13 and a turbine 15, respectively. Air from an upstream intake pipe 16a is pressurized by the compressor 14, and then passes through an intercooler 17 of a downstream intake pipe 16b, so as to be cooled down. The thus cooled pressurized air passes through an intake throttle valve 18 and then supplied to the diesel engine 10 from the intake manifold 11. Exhaust gas from the diesel engine 10 drives the turbine 15 and is then discharged to an exhaust pipe 20.

A mass air flow sensor (MAF) 19 is provided on the upstream intake pipe 16a and controls an opening degree of the intake throttle valve 18, so that air intake volume is adjusted. Further, an exhaust gas recirculation (EGR) pipe 21 for returning a part of the exhaust gas to an air intake system of the engine 10 to thereby reduce NOx is connected to the exhaust pipe 20 and the upstream intake pipe 16a. Further, an EGR cooler 22 and an EGR valve 23 are connected to the EGR pipe 21.

An exhaust brake valve 24, a diesel particulate defuser (DPD) 25, an exhaust throttle valve 26, and a silencer 27 are connected to the exhaust pipe 20. The DPD 25 is composed of a diesel oxidation catalyst (DOC) 28 including an active catalyst for oxidizing unburned fuel and a catalyzed soot filter (CSF) 29 for trapping particulate matter (PM) contained in the exhaust gas. Further, while not shown in the figure, a selective catalytic reduction (SCR) apparatus for reducing NOx with ammonia is connected between the exhaust throttle valve 26 and the silencer 27.

Exhaust gas temperature sensors 30a and 30b are provided in front and back of the DOC 28, respectively. Further, a differential pressure sensor 31 for detecting the amount of the PM accumulated in the CSF 29 is also provided. Detected values detected by these sensors are input into an engine control unit (ECU) 32.

A detected value detected by an engine speed sensor 33 for detecting an engine speed, a detected value detected by a vehicle speed sensor 34, and a detected value detected by an atmospheric pressure sensor 35 are also input into the ECU 32.

While a vehicle is running, the ECU 32 controls a fuel injection quantity in a fuel injector 38 according to an accelerator position. In addition, the ECU 32 appropriately controls the intake throttle valve 18, the exhaust brake valve 24, and the exhaust throttle valve 26.

In this exhaust gas treatment system, when the ECU 32 determines that a certain amount of PM has been accumulated in the DPD 25 based on the detected value detected by the differential pressure sensor 31 which detects a differential pressure between front and back of the CSF 29, or when a running distance of the vehicle after the previous regeneration has reached a predetermined value, the temperature of the exhaust gas from the diesel engine 10 is raised to approximately 600° C. in the end so as to burn the PM to thereby regenerate the DPD 25.

This regeneration is carried out in such a manner that multiple injection (pilot injection, pre injection, main injection, and after injection) is performed by the fuel injector 38 so that the temperature of the exhaust gas is raised to or above a catalyst activation temperature of the DOC 28, and post injection is then performed to thereby raise the temperature of the exhaust gas to, for example, 500° C. and then 600° C., thereby burning the PM. Usually, the regeneration is automatically performed while the vehicle is running. However, since fuel oil is mixed into lubricating oil in a cylinder due to the post injection and dilution of the lubricating oil therefore occurs, the amount of the dilution is reduced by manual regeneration.

Figure 2:
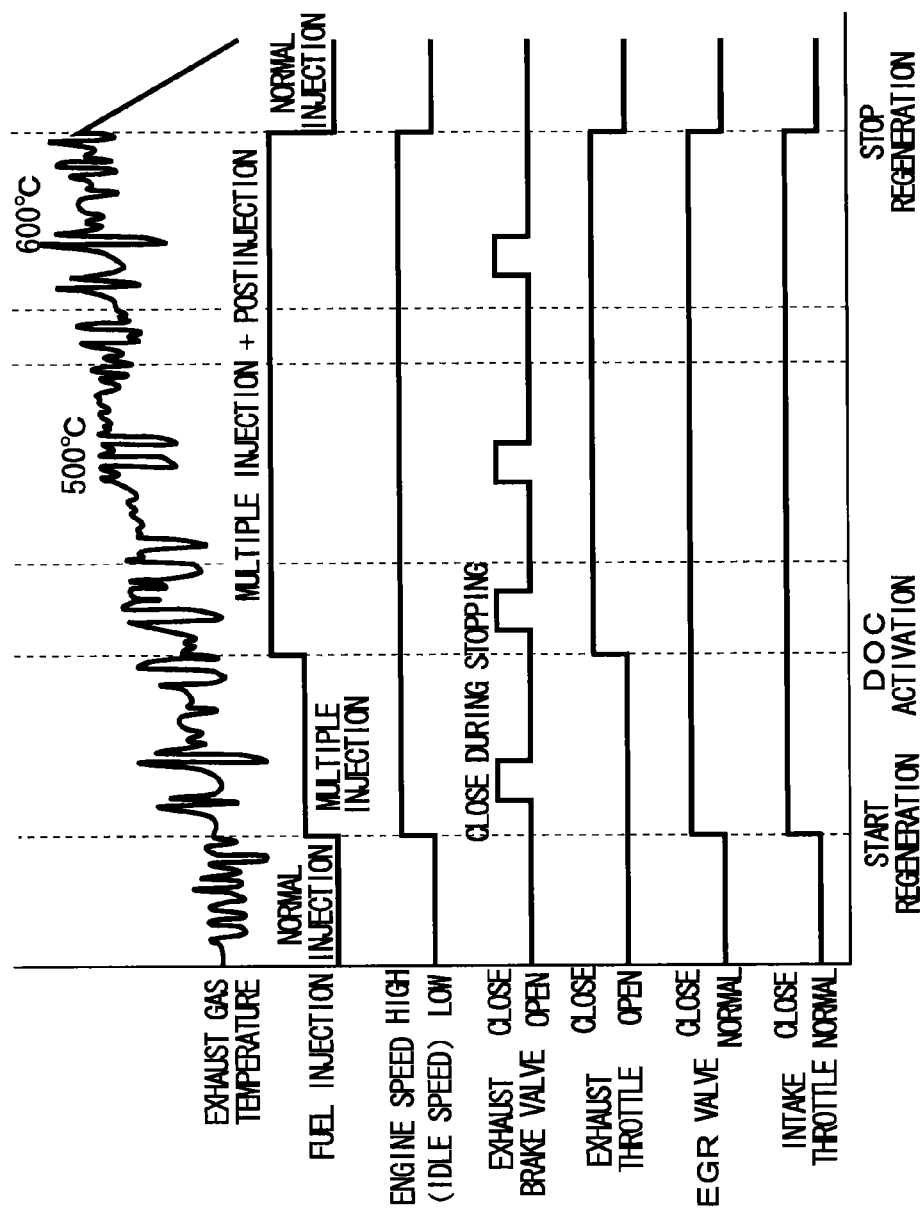
FIG. 2 is a control chart during automatic regeneration in the present invention.

Here, a control chart of the ECU 32 during the automatic regeneration will be described with reference to FIG. 2.

When the regeneration is automatically performed, the ECU 32 throttles the intake throttle valve 18, closes the EGR valve 23, performs the multiple injection to thereby raise the temperature of the exhaust gas to or above the catalyst activation temperature, so that the temperature of the catalyst of the DOC 28 is raised, and then performs the post injection in addition to the multiple injection to raise the temperature of the exhaust gas to, for example, 500° C. and then 600° C., thereby burning the PM. As a result, the DPD 25 is regenerated. After the completion of the regeneration, controls of the intake throttle valve 18 and the EGR valve 23 are returned to normal controls.

During the automatic regeneration, when the vehicle is in a stopped state due to a traffic light and the like, an engine speed is raised from a normal idle speed to an idle speed for regeneration (hereinafter, referred to as a regeneration idle speed) when a gear of a transmission is in a neutral position. On the other hand, when the vehicle is in gear, a regeneration idle speed is set to be lower than the regeneration idle speed when the gear is in a neutral position so as to prevent a sudden start when the vehicle starts to move from the stopped state. Further, during the automatic regeneration, an automatic regeneration warning lamp 36b is lighted by the ECU 32. Compare to with the manual regeneration start switch 37 and the manual regeneration warning lamp 36a shown in FIG. 1.

When the multiple injection is switched to the post injection to thereby regenerate the DPD, if the temperature of the exhaust gas is raised directly to 600° C., the accumulated PM is burned at once. Therefore, in order to prevent the accumulated PM from being burned at once, a quantity of the post injection is controlled so that an initial target regeneration temperature is set at, for example, 500° C. to thereby burn a certain amount of the PM in the DPD and the target temperature is then changed to a final target regeneration temperature so as to be, for example, 600° C.

Next, PID control of the quantity of the post injection will be described.

First, the temperature of the exhaust gas is detected by the exhaust gas temperature sensor 30b described above with reference to FIG. 1 during the automatic regeneration. Then, the ECU 32 calculates a deviation e between the target regeneration temperature and the detected exhaust gas temperature, after which the ECU 32 determines, on the basis of the calculated deviation e, a manipulated variable M of the post injection which is carried out by the fuel injector 38, by the PID control.

The manipulated variable M is indicated by the following formula.

$$M = Kp \cdot e + Ki \cdot (1/Ti) \cdot \int e \, dt + Kd \cdot Td (de/dt)$$

In the above formula, Kp is a proportionality constant of proportional control; Ki is a proportionality constant of integral control; Kd is a proportionality constant of derivative control; Ti is an integral time; Td is a derivative time; and t is a time.

Further, the manipulated variable M is determined by the sum of a proportional control term, an integral control term and a derivative control term. An actual quantity of the post injection is determined by adding a manipulated variable of a base term to the manipulated variable M, along with a fuel pressure and a valve opening duration of the fuel injector 38.

The PID control makes it possible to raise the temperature of the exhaust gas according to the quantity of the post injection during the running mode automatic regeneration due to high engine speed. Therefore, it is possible to precisely control the temperature of the exhaust gas with respect to the target regeneration temperature.

Immediately before stopping the vehicle because of need to wait for a traffic light or traffic conditions, the engine speed is reduced, the amount of the exhaust gas is also reduced, and the deviation e is therefore increased. In this state, when the vehicle is stopped, the temperature of the exhaust gas in the DPD 25 is controlled so as not to be lowered by closing the exhaust brake valve 24 and the exhaust throttle valve 26 to thereby increase the injection quantity. Further, the engine speed is increased from the normal idle speed to the regeneration idle speed regardless of whether the vehicle is in neutral or in gear. However, the regeneration idle speed is lower than the engine speed while the vehicle is running. Therefore, air intake volume to the engine and the amount of the exhaust gas are also reduced, which makes it difficult to maintain the temperature of exhaust gas at the target regeneration temperature or raise the temperature of exhaust gas to the target regeneration temperature. As a result, the deviation e is further increased.

In a case where the deviation e is constant, the proportional control term and the derivative control term are also constant. However, since the integral control term integrates the thus increased deviation e, the quantity of the post injection is increased to an upper limit during the idling mode regeneration. In this control state, when the vehicle starts to move from the stopped state and the idling mode regeneration is shifted to running mode automatic regeneration, the air intake volume is increased along with increase of the engine speed. Accordingly, the temperature of the exhaust gas is increased rapidly, which may cause erosion of the DPD 25.

Therefore, in the present invention, when starting the idling mode automatic regeneration after the vehicle is stopped, the integral control term in the control formula of the PID control is reset to zero along with a closing operation of the exhaust brake valve 24. By resetting the integral control term to zero in such a manner, the integral of the deviation e when the vehicle is in a running state immediately before stopping becomes zero. Therefore, it is possible to stably perform the idling mode automatic regeneration by determining the quantity of the post injection by the PID control on the basis of the deviation e when the vehicle is in a stopped state.

Further, when the vehicle starts to move within a predetermined time (within 3 minutes) after the vehicle is stopped while the idling mode automatic regeneration is being performed after the zero reset, the running mode automatic regeneration can be performed with no problem with the control of the quantity of the post injection by the PID control after the zero reset. On the other hand, when a stoppage time of the vehicle exceeds 3 minutes, the manipulated variable of the integral control term is increased. Therefore, the integral control term is again reset to zero and the running mode automatic regeneration is then performed, thereby making it possible to prevent occurrence of overshoot of the temperature of the exhausts gas.

As described above, in the present invention, the idling mode automatic regeneration can be stably performed by resetting the integral control term in the PID control when the quantity of the post injection is controlled by the PID control during the idling mode automatic regeneration. Further, after the idling mode automatic regeneration, a determination is made as to whether the integral control term is again reset to zero, or not reset and the control is continued without change, according to the stoppage time of the vehicle. As a result, even when the idling mode automatic regeneration is shifted to the running mode automatic regeneration, the shift can be carried out with no problem.

The invention claimed is:

1. An exhaust gas purification system in which a diesel particulate defuser for trapping particulate matter in exhaust gas is connected to an exhaust pipe of a diesel engine to automatically regenerate the diesel particulate defuser by raising a temperature of the exhaust gas from a diesel engine by carrying out post injection by injecting diesel fuel into a cylinder of the engine when an amount of the particulate matter in the diesel particulate defuser exceeds a predetermined amount, the system comprising:
   detecting the temperature of the exhaust gas during diesel particulate defuser regeneration when the diesel particulate defuser is automatically regenerated;
   calculating a deviation between the detected temperature of the exhaust gas and a target temperature for the diesel particulate defuser regeneration; and
   controlling a quantity of the post injection by resetting an integral control term used in a proportional-integral-derivative control to zero when running mode automatic regeneration is shifted to idling mode automatic regeneration after a vehicle is stopped, when proportional-integral-derivative-controlling the quantity of the post injection based on the deviation.

2. The exhaust gas purification system according to claim 1, wherein when the vehicle is slowed down and then stopped during the running mode automatic regeneration, the post injection controlled by the proportional-integral-derivative control is continuously carried out while the vehicle is being slowed down, and the integral control term in the proportional-integral-derivative control is reset to zero after the vehicle is stopped.

3. The exhaust gas purification system according to claim 1, wherein an exhaust brake valve is closed when the idling mode automatic regeneration is started, and the exhaust brake valve is opened when the idling mode automatic regeneration is shifted to the running mode automatic regeneration.

4. The exhaust gas purification system according to claim 1, wherein when the idling mode automatic regeneration is shifted to the running mode automatic regeneration within a predetermined time after the idling mode automatic regeneration is started after the vehicle is stopped, the quantity of the post injection is continuously controlled by the proportional-integral-derivative control in which the integral control term is reset to zero in the idling mode automatic regeneration.

5. The exhaust gas purification system according to claim 4, wherein the predetermined time is 3 minutes.

6. The exhaust gas purification system according to claim 4, wherein an exhaust brake valve is closed when the idling mode automatic regeneration is started, and the exhaust brake valve is opened when the idling mode automatic regeneration is shifted to the running mode automatic regeneration.

7. The exhaust gas purification system according to claim 5, wherein an exhaust brake valve is closed when the idling mode automatic regeneration is started, and the exhaust brake valve is opened when the idling mode automatic regeneration is shifted to the running mode automatic regeneration.

8. The exhaust gas purification system according to claim 1, wherein when the idling mode automatic regeneration is shifted to running mode automatic regeneration over a lapse of a predetermined time after the idling mode automatic regeneration is started after the vehicle is stopped, the integral control term in the proportional-integral-derivative control is again reset to zero.

9. The exhaust gas purification system according to claim 8, wherein the predetermined time is 3 minutes.

10. The exhaust gas purification system according to claim 8, wherein an exhaust brake valve is closed when the idling mode automatic regeneration is started, and the exhaust brake valve is opened when the idling mode automatic regeneration is shifted to the running mode automatic regeneration.

11. The exhaust gas purification system according to claim 9, wherein an exhaust brake valve is closed when the idling mode automatic regeneration is started, and the exhaust brake valve is opened when the idling mode automatic regeneration is shifted to the running mode automatic regeneration.

* * * * *